United States Patent

[11] 3,615,596

| [72] | Inventors | Albert F. Petti<br>421 Lexington Ave., Cranford, N.J. 07016;<br>Louis J. Perrotti, 419 Morristown Road,<br>Linden, N.J. 07036 |
|---|---|---|
| [21] | Appl. No. | 882,114 |
| [22] | Filed | Dec. 4, 1969 |
| [45] | Patented | Oct. 26, 1971 |

[54] WRITING ACCESSORY
5 Claims, 6 Drawing Figs.

[52] U.S. Cl. ................................................. 99/138, 401/52
[51] Int. Cl. ........................................................ A23g 3/00
[50] Field of Search .......................................... 99/138 S, 138; 401/52, 195

[56] References Cited
UNITED STATES PATENTS

| 558,733 | 4/1896 | Lathrop | 401/52 X |
| 1,913,851 | 6/1933 | Oprean | 99/138 S |
| 2,085,330 | 6/1937 | Price | 99/138 S |
| 2,336,779 | 12/1943 | Creasy | 401/52 X |
| 2,617,324 | 11/1952 | Brody | 99/138 S |

Primary Examiner—Tim R. Miles
Attorney—Davis B. Dwinell

ABSTRACT: A writing accessory comprising an elongated holder member having a hard candy comestible affixed to one end. The other end of the holder member has a socket formation for reception of the free end of a writing implement.

PATENTED OCT 26 1971
3,615,596
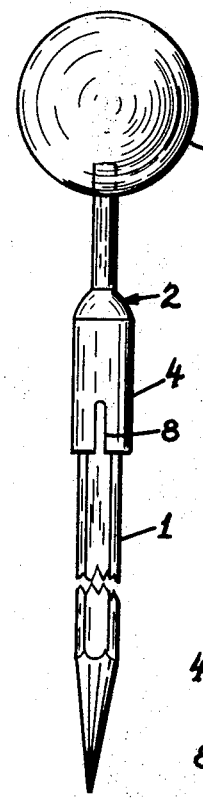
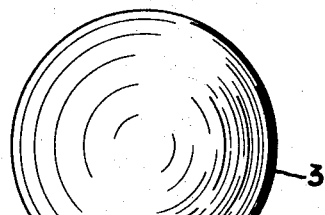
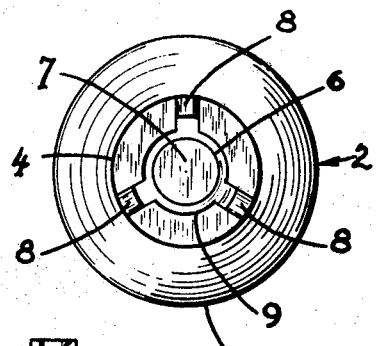
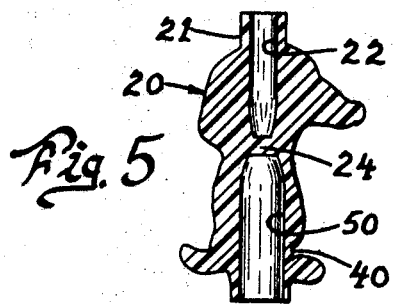
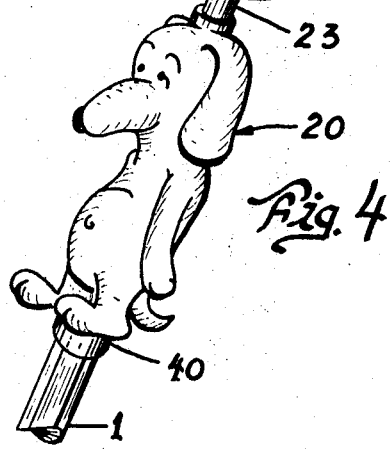
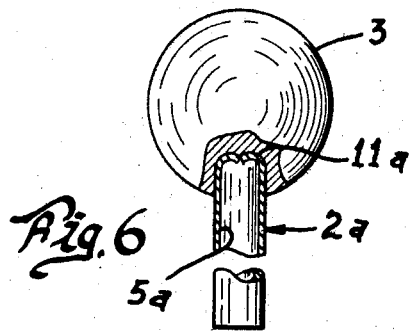
A. F. PETTI
L. J. PERROTTI
INVENTORS
BY Davis B. Dunnell

WRITING ACCESSORY

This invention is directed to writing accessories and is particularly concerned with holder members for hard candy comestibles used in conjunction with hand manipulated writing implements.

The problem of providing children with incentive to master the writing skill is long standing. One approach to this problem commonly employed has been the provision of a piece of candy to encourage written academic exercises. Stick mounted comestibles commonly known as lollipops are particularly advantageous for this purpose as they prevent over indulgence of sweets over an extended period of time. Conventional lollipops, however, fail to provide a complete solution to the problem as they require the use of one hand for manipulation which can prove to be more of a distraction than a learning aid.

This invention encourages children to master the writing skill by making the use of writing implements a pleasurable experience. This is accomplished by making it possible for a child to perform written exercises while enjoying an occasional stimulating lick on a lollipop, leaving one hand free to hold the paper. A holder member is affixed to the free end of a writing implement and supports a hard candy comestible in the form of a lollipop. Writing dexterity is thus encouraged without any appreciable distraction from the learning process.

It is accordingly a principal object of this invention to provide a new and useful writing accessory.

Another object is to provide a new writing aid for children.

Another object is to encourage the execution of writing exercises by providing a candy comestible which can be consumed simultaneously with said execution.

A further object is to provide a holder member for a lollipop which is affixed to the free end of a writing implement.

Further and more detailed objects of the invention will in part be pointed out and in part be apparent as the description of the invention taken in conjunction with accompanying drawing proceeds.

In the drawings:

FIG. 1 is an elevational view of a pencil carrying the holder member and lollipop in accordance with the invention;

FIG. 2 is part sectional part elevational view of the holder member and lollipop;

FIG. 3 is an elevational view taken on line 3—3 of FIG. 2 and looking in the direction of the arrows;

FIG. 4 is perspective view of a modified form of the invention;

FIG. 5 is a sectional view of the modification of FIG. 4; and

FIG. 6 is part sectional part elevational view of a further modified holder member and lollipop.

Considering first the principal embodiment of the invention, FIG. 1 shows the combination of a pencil 1, a holder member 2, and a hard candy comestible 3 commonly referred to as a lollipop. The holder member 2, illustrated in detail in FIGS. 2 and 3, can be molded of fibrous paper material or synthetic plastic material such as polyethylene and has a lower portion formed as a hollow socket 4. The socket 4 has a cylinder interior surface 5 which merges at its upper end into an inwardly tapered conical wall 6 and terminates in an end wall 7. A plurality of axially extending slots 8, preferably three in number, is formed in the lower end portion of the socket 4. A radially inwardly extending rib 9 is formed at the lowermost end of the socket 4. The upper portion of the holder member 2 has an axially extending shank 10 which has its upper end portion 11 embedded in the hard candy comestible 3.

The holder member 2 is affixed to the pencil 1 by inserting the free end of the pencil into the socket 4, causing the lower end portions of the socket to expand radially in the area of the slots 8. The holder member 4 is securely retained on the pencil by the gripping action of the bead 9, with the uppermost end of the pencil wedged against the socket interior conical wall 6.

FIG. 4 illustrates a modified form of holder member indicated by numeral 20 and shaped as a figurine. As shown in FIG. 5 the holder member 20 has a lower socket portion 40 with an interior cylindrical surface 50 adapted to make a friction fit engagement with the free end of the pencil 1. The upper portion of holder member 20 has an axially directed upwardly opening socket 21 formed with an interior cylindrical surface 22 adapted to frictionally engage a lollipop stick 23 having molded thereon a hard candy comestible 3. A transverse wall 24 separates the upper socket 21 from the lower socket 40. In the modification illustrated in FIGS. 4 and 5, the figurine shaped holder member has the added advantage of being capable of receiving replacement lollipops as they are consumed.

In FIG. 6 a further modified form of the invention is illustrated wherein the holder member 2a comprises a hollow tube having a cylindrical surface 5a adapted to frictionally engage the free end of a pencil. The uppermost end of the tube wall is formed over radially inwardly as indicated at 11a and embedded in the hard candy comestible 3.

Each of the above disclosed embodiments carry out the objects of the invention with varying degrees of versatility and interest stimulation. The invention effectively encourages the pursuit of written exercises by young children in simultaneously providing an enjoyable taste treat. By having a hard candy comestible affixed directly to the free end of the writing implement, the same can be conveniently consumed with a minimum of distraction leaving one hand free for holding the paper being written on.

Having disclosed our invention what we claim as our invention is as follows:

1. A writing accessory to encourage young children in the use of writing implements comprising an axially extending holder member having a lower socket portion, said lower socket portion having a cylindrical interior surface adapted to frictionally engage the free end of a writing implement, said holder member having an upper portion provided with axially elongated supporting means and a hard candy comestible affixed to said supporting means whereby said hard candy comestible can be consumed during execution of writing exercises with said writing implement.

2. A writing accessory as in claim 1 wherein said supporting means includes an elongated shank having its upper end embedded in said hard candy comestible.

3. A writing accessory as in claim 2 wherein said elongated shank is an integral part of said holder member.

4. A writing accessory as in claim 2 wherein said elongated shank is a separate element having its lower end frictionally engaged in said supporting means.

5. A writing accessory as in claim 1 wherein said lower socket portion is formed with resilient friction engaging means.

* * * * *